Inventor
James Byron Jones

Inventor
James Byron Jones

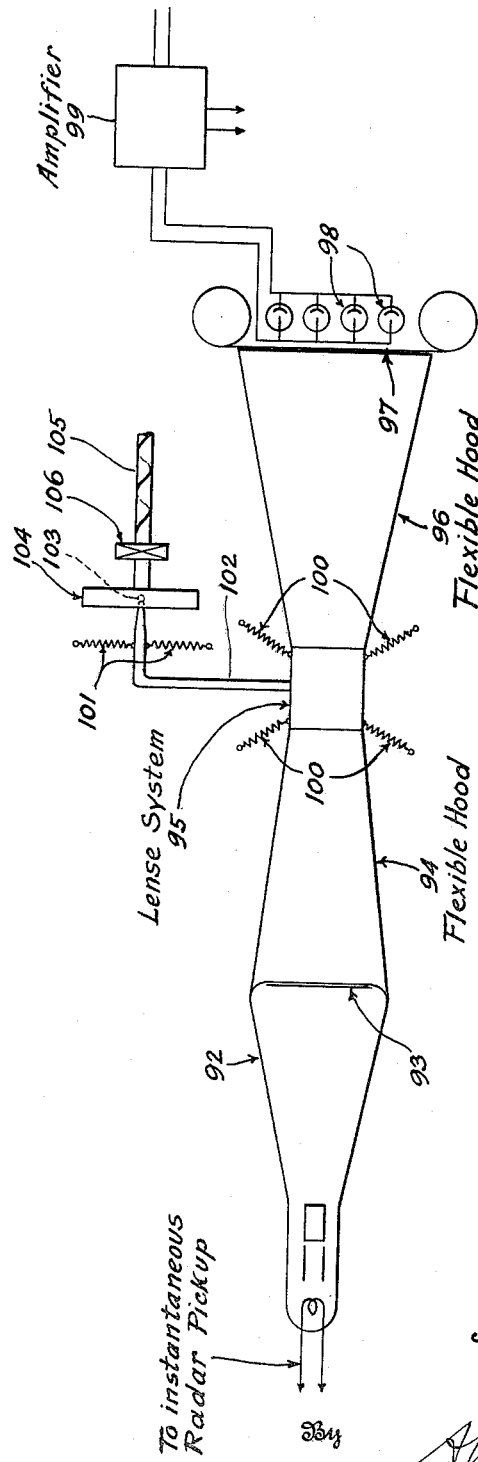

United States Patent Office 3,155,969
Patented Nov. 3, 1964

3,155,969
METHODS AND APPARATUS FOR AUTOMATI-
CALLY GUIDING AN AIRPLANE OR THE LIKE
James Byron Jones, Stamford, Conn., assignor to Good-
year Aerospace Corporation, a corporation of Delaware
Filed Dec. 6, 1947, Ser. No. 790,151
12 Claims. (Cl. 343—7)

This invention relates to methods and apparatus for controlling and guiding vehicle movement, and, more particularly, is concerned with automatic or substantially automatic methods and apparatus for guiding aircraft and like bodies between points on the earth's surface.

Automatic pilots are well known for use in controlling the movement of a torpedo, or for guiding and controlling the flight of an airplane, but such known devices, while having certain advantages and functions, fail to guide and control a vehicle or body with sufficient accuracy, particularly when the vehicle or body moves over relatively long distances.

It is the general object of the present invention to avoid and overcome the foregoing and other difficulties of and objections to known methods and apparatus for automatically guiding and directing vehicles and bodies by the provision of improved methods and apparatus for controlling the flight of aircraft, the movement of boats, submarines, torpedos, and the like, with a greater accuracy and in a more positive manner than has heretofore been possible.

Another object of the invention is to provide automatic mechanism and methods for guiding a vehicle or other body along a given path and to keep the vehicle or body on this path by comparison of a series of instantaneous pictures of the path with a previously provided picture of the path over which the vehicle or body is to be moved, and to automatically correct the movement of the vehicle or body to the previously selected path.

Another object of the invention is the provision of methods and apparatus for matching a known radar strip map with an instantaneous radar image, followed by the establishment of corrective factors which will bring the vehicle or body to substantially center the instantaneous radar image on the strip radar map.

The foregoing objects of the invention, and other objects which will become apparent as the description proceeds, are achieved by the provision in combination, of a strip film bearing a map of a stretch of terrain over which a body is to move, motor means for unwinding the film, means for presenting an instantaneous image of the terrain over which the body is moving, said instantaneous image being superimposed relative to the map image, means for effecting periodically repeated scanning movement between the superimposed images, means for indicating substantially a match between the images, and means for controlling a direction of movement of the body in response to the position of match of the images.

For a better understanding of the invention, reference should be had to the accompanying drawings, wherein:

FIG. 7 is a view similar to FIG. 1, but illustrating another embodiment of the apparatus incorporating the principles of the invention.

It will be recognized that the invention herein illustrated and described may be employed in conjunction with the controlling and guiding of vehicles, bodies, missiles, and the like, of a wide variety of types, and used for various different purposes. For example, the features of the invention can be utilized in conjunction with submarines, surface vessels, rockets, and the like, but the invention is primarily concerned with the controlled flight of an aircraft driven by jet propulsion or other means, and, accordingly, the invention has been so illustrated and will be so described.

Furthermore, it is to be understood that the words "map," and "image," and the like, employed in the specification and claims, are intended to include optical, acoustical, radar or other pictures, maps, or images. However, one best known embodiment of the invention is concerned with radar maps and instantaneous radar images, and the invention has been illustrated accordingly and will be so described.

In utilizing the invention with an airplane, or other type of aircraft, and to control the flight of the airplane over rather widely separated points of the earth's terrain, it is advisable to incorporate in the airplane the usual and known automatic pilot mechanism, the apparatus and methods of the invention functioning to provide the final, or it might be said, vernier control to exactly keep the airplane on course, but with the automatic pilot functioning to substantially overcome normal disturbing influences, such as up or down drafts, sudden gusts, and the like. Also, the automatic pilot mechanism should function to keep the airplane parallel to the desired course. However, it may be noted that many of the advantages of the invention are realized without the automatic pilot, and the invention is not to be limited to operations in association with an automatic pilot.

Figure 1:
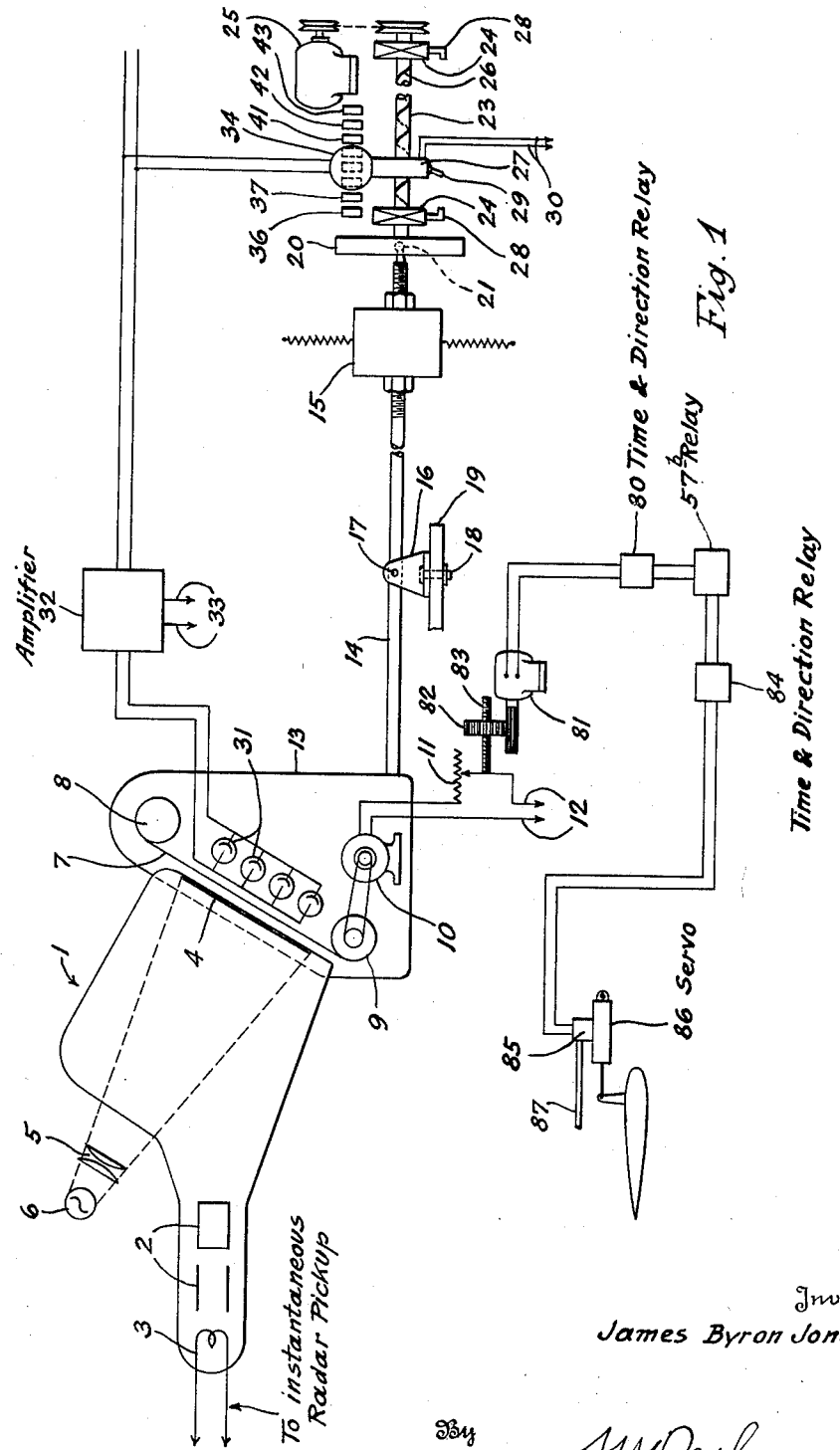
FIG. 1 is a schematic assembly view of one embodiment of apparatus incorporating the principles of the invention.

In accord with the principles of the invention, there is incorporated in the airplane in addition to the conventional automatic pilot mechanism, an instantaneous radar pick-up. In FIG. 1 of the drawings, the numeral 1 indicates generally an oscilloscope having deflector plates 2, electron generator 3, screen 4, and the usual lead-in means and associated apparatus (not shown) to impose upon the screen 4 an instantaneous radar image of the terrain over which the airplane is passing. Preferably, but not necessarily, incorporated with the oscilloscope is a lens system 5 and a light source 6, so that with the oscilloscope envelope being shaped as shown and with the screen 4 inclined, as illustrated, and being of the dark-trace type, a light beam will be thrown through the screen 4 to direct the image thereon against a strip of film 7.

It will be understood that if a projection system (lens 5 and light 6) is used with the screen 4, the screen must be of the dark-trace type described (disclosed, for example, in British Patent No. 536,720) and the image on the screen will have areas verging from transparent to opaque. On the other hand, if the lens 5 and light 6 are not used then the screen 4 is conventional, that is of substantially uniform opaqueness and having various portions glowing to dark controlled by the usual electron flow. The system illustrated and described in FIG. 1 can be used with a conventional oscilloscope screen 4, with the radar image on the screen matching with the map image on the film 7 as determined by the photoelectric means behind the film 7, all as hereinafter described.

The film 7 bears a strip radar image or map of the terrain over which the airplane is to fly, and the strip is continuously unrolled from one spool 8 and is wound up on a second spool 9, the spool 9 being driven by a motor 10 whose speed is controlled by varying a rheostat 11, in a manner to be hereinafter described. Electric leads 12 extend to a suitable power source. By a strip radar image or map is means a panoramic reproduction of the radar picture of the terrain over which the airplane is to fly. A conventional strip map in panoramic form of an automobile route is well understood. The strip radar image or map is broadly similar but shows a radar picture in panoramic form taken from a selected distance from the ground and illustrating the terrain path flow by or to be flown by the airplane.

The instantaneous radar image on the screen 4, and the strip radar image on the film 7, are adapted to be relatively moved to effect a match of the images. This relative movement can be effected in a number of different ways. One manner of achieving the matching action is to mount the spools 8 and 9, and the motor 10, on a frame 13, which is carried at one end of a rod 14, the other end of the rod being provided with an adjustable, resiliently positioned, counterweight 15. Positioned intermediate the frame 13 and the counterweight 15 is a pivotal support for the rod 14, the numeral 16 indicating a bracket having a horizontal pivotal connection 17 with the rod 14, and with the bracket 16 being mounted for rotation about a vertical pivot 18 carried in a fixed plate 19.

Figure 2:
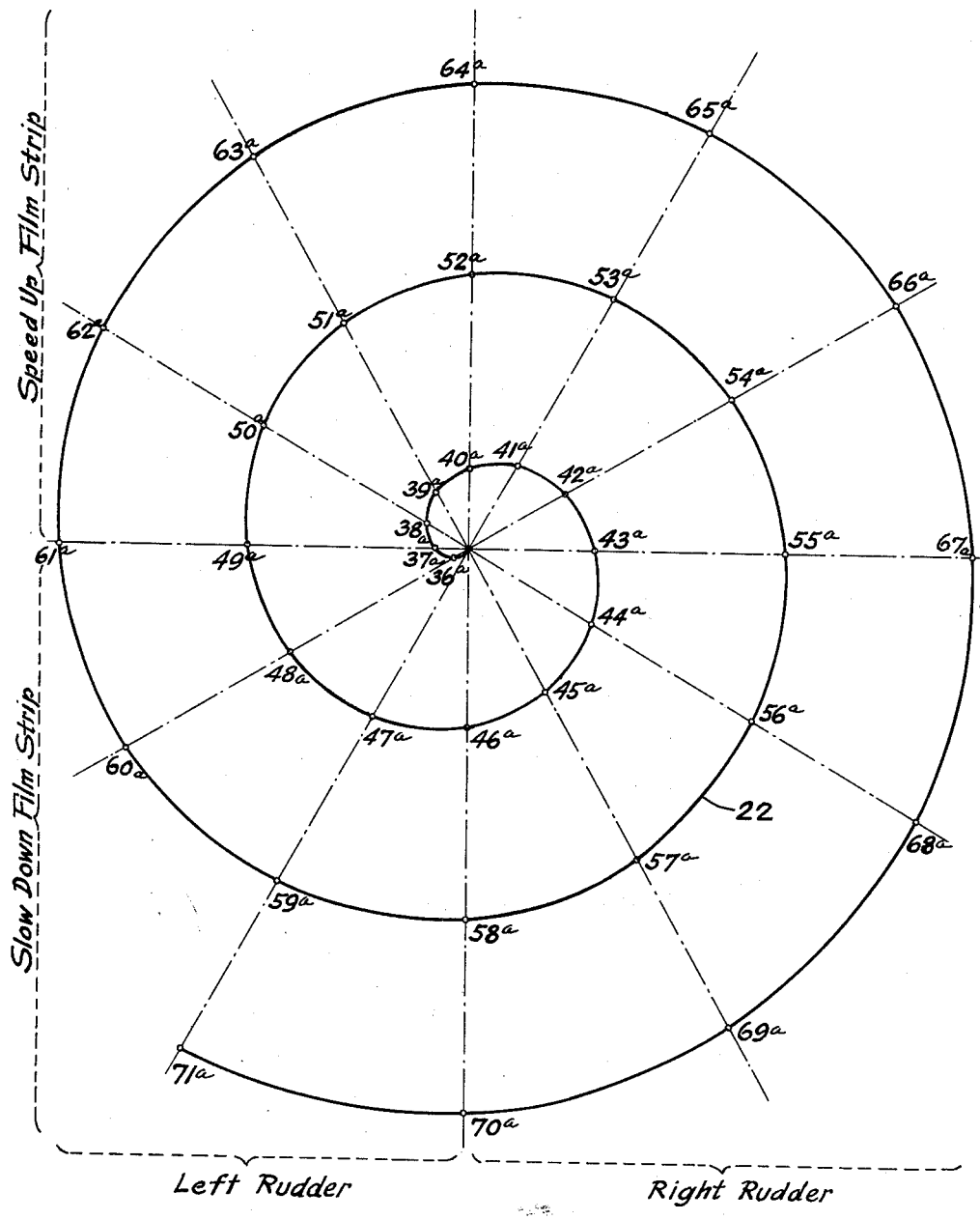
FIG. 2 is a diagrammatic view of the type of scanning between the map image and the instantaneous image.

The film strip 7 is adapted to be given a scanning movement relative to the screen 4, and while this scanning movement may be accomplished by various mechanisms, one convenient manner of achieving the desired scanning action is to provide a cam plate 20 adjacent the resiliently-positioned, counterweighted end of the rod 14, and to have this end of the rod carry a cam follower 21 which rides in a spirally cut cam groove on the side face of the plate 20. Reference should be had to FIG. 2 of the drawings in which the line 22 indicates a typical shape in which the cam groove may be cut in the side of the circular plate 20. The plate 20 is secured to the end of a shaft 23 which is journaled in bearings 24, the shaft being adapted to be rotated by a reversible motor 25.

The shaft 23 is formed with a helical groove 26, and slidably mounted upon the shaft 23 is a block 27 which carries a cam follower which fits down into the groove 26. Thus, as the shaft 23 is rotated, the block 27 will move from one end to the other of the shaft. At the same time the cam follower 21 riding in the cam slot 22 in the side of the circular plate 20 will cause the film strip 7 to be given a spiral scanning movement with relation to the screen 4. As the block 27 begins to reach the end of its movement upon the shaft 23, and at the same time with the cam follower 21 beginning to reach the end of its movement in the cam track 22 of the circular plate 20, a stop 28 mounted on the bearing 24 will strike a switch arm 29 of a switch carried on the block 27 to throw the switch in the opposite direction and reverse the drive of the electric motor 25. In this connection, it will be recognized that the electric leads 30 extending to the motor 25 run through the reversing switch carried by the block 27.

Accordingly, the block 27 will move from end to end of the shaft 23 as it is driven in alternate directions, and the film strip 7 will be given a spiral scanning action inwardly and outwardly and inwardly, etc. with relation to the instantaneous radar image on the screen 4. Inasmuch as the airplane is held against radical departure from its course by means of the automatic pilot, and is at all times at least substantially parallel with the course, the scanning action described will result substantially in a matching of the instantaneous radar image on the screen 4 and the strip radar image on the film 7.

The images to be matched are made so that at the time of the match a maximum or a minimum amount of light will go through the matched images from the light source 6. One convenient way to accomplish this result is to make the radar image on the screen 4 either a positive or a negative, and to make the strip radar image on the film 7 just the opposite. In other words, if the instantaneous radar image on the screen 4 is positive, then the radar image on the film strip 7 is made negative so at the time of match a minimum amount of light will flow through the matched images.

In order to pick off the minimum, or the maximum, if this should be the case, one or more photo-electric cells 31 are mounted on the frame 13, and these photo-electric cells, which may be connected either in series or in parallel, extend to the input of an amplifier 32 connected to a power source by electric leads 33. The output of the amplifier 32 extends to a solenoid tripping device 34 mounted on the block 27.

Figure 3:
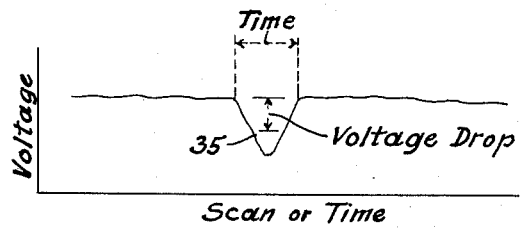
FIG. 3 is a graph illustrating the matching of the map and instantaneous images.

The construction of the solenoid tripping device 34 carried by the block 27 is such that it will not operate until the minimum voltage condition is experienced by the photo-electric cells 31, this condition being either a voltage drop beyond a selected magnitude, or a voltage drop over a definite period of time. In FIG. 3 is diagrammatically illustrated the type of curve obtained by plotting voltage against time during the scanning or matching efforts between the screen 4 and the film strip 7. The numeral 35 indicates a typical drop in voltage as occasioned by a matching of positive and negative images on the screen 4 and film strip 7. When this match occurs as detected by the photo-electric cells 31, the solenoid trip device 34, in response either to the voltage drop or the time interval of the drop, will drive a plunger sharply downward to punch a key, namely, one of the keys identified by the numerals 36 to 71.

Figure 6:
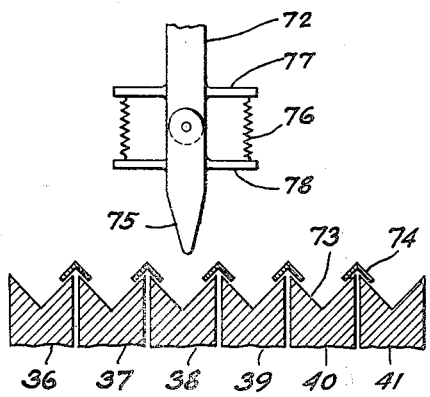
FIG. 6 is an enlarged fragmentary view of a portion of the apparatus incorporated with FIG. 1.

In FIG. 6, I have shown the bottom end of the plunger 72 which is adapted to be driven downwardly by the trip solenoid 34. In order to prevent the plunger 72 from striking two keys at once, the keys are formed with notches 73, and with inverted fixed tapered guides 74. The bottom of the plunger 72 is formed with a pivoted extension 75 which is normally held in alignment with the plunger 72 by springs 76 carried between fixed lugs 77 on the plunger and lugs 78 affixed to the extension 75. In this manner, as the plunger 72 is driven sharply downward by the solenoid 34, the extension 75 of the plunger will always drop into engagement with one of the keys 36 to 71 to punch this key.

Now, referring to FIG. 2 of the drawings in which the numerals 36 to 71 likewise appear, it will be evident that when the block 27 is in a certain position on the shaft 23 so that a given key, for example, key 57ª, is punched, that the cam follower 21 will be substantially at the position 57 in the cam track 22, and the position in the scanning action, at the point of match of the instantaneous radar image and the strip radar map will be known. In FIG. 2, the spiral scanning path has been marked with appropriate designations, namely, the upper half of the scanning path is marked with the notation—"Speed Up Film Strip"—and all points or keys lying in this half of the scanning path will require the speeding up of the motor 10 to speed up the movement of the film strip 7. On the other hand, the lower half of the scanning path is marked with the notation—"Slow Down Film Strip"—and all points or keys in this half of the scanning path will require the slowing down of the motor 10 and the film strip 7.

In like manner, the left half of the scanning path shown in FIG. 2 is marked with notation—"Left Rudder"—and all scanning points or keys in this half of the scanning path will necessitate the application of left rudder to bring the airplane back substantially exactly on course. In a like manner, the right hand half of the scanning path of FIG. 2 is marked with the notation—"Right Rudder"—and all keys in this half will result in the application of corrective right rudder to bring the airplane back on proper course.

Considering the arrangement of the parts more specifically, particularly with respect to the manner of correcting the course of the airplane, in FIG. 1 is illustrated a single relay 57$^b$, it being understood that the relay 57$^a$ is actuated when key 57 is punched. From FIG. 2, it will be seen that point 57$^a$ is in the right rudder half and slow down film strip half of the relative scanning movement. Relay 57 actuates a time and direction relay 80 which gives a predetermined shot of electric current to an electric motor 81 which drives through gearing 82 to screw a threaded shaft 83 to the right, the threaded shaft 83 being connected to the arm of the rheostat 11 so that the motor 10 is slowed down a given amount to thereby allow the airplane to "catch up" with the movement of the film strip 7.

It is to be understood in this connection that punching the key 57$^b$, and thus operating the relay 57, which in turn operates its own time and direction relay 80, will move the rheostat arm a somewhat greater distance and reduce the speed of the motor 10 a somewhat greater amount than if the plunger of the solenoid 34 had punched key 45. In other words, the key 45 would operate its own relay which in turn would operate its own time selector and direction relay to slow down the speed of the film strip 7, but the point 45 being closer to the horizontal, center line 61–67 of the scanning path shown in FIG. 2 would not reduce the speed of the film strip quite as much as when the key 57 is punched. In a like manner, when the key 69 is punched, it will operate through its own relays as described to reduce the speed of the film strip still more than when the key 57 is punched.

Furthermore, punching the key 57$^b$ to operate the relay 57 not only operates the relay 80 to reduce the speed of the film strip 70, but in addition, operates a time selector and direction relay 84 which extends to a solenoid valve 85 mounted on a pressure cylinder or servo motor 86. The solenoid valve 85 controls the flow of pressure fluid from a line 87 to the pressure cylinder or motor 86. The pressure cylinder 86 is adapted to act as a servo motor to control the position of a control surface 88, such as the rudder, on the airplane, and the operation of the relay 84 gives a selected amount of right rudder to the airplane for a period of time determined by the relay 84. The point 57$^a$ being relatively close to the neutral or vertical center line marked by the point 46$^a$–70$^a$ means that the right rudder applied by the relay 84 will be for a shorter time interval than if the key 68 had been struck to work through its own relay system.

Although the invention has only illustrated the relays 80 and 84 controlled by an individual master relay 57$^b$, it will be recognized that one or more additional relays may be incorporated to be controlled by the master key relay, to provide additional control functions on the airplane, such as the control of the elevators, although this is usually not necessary or advisable. It will be understood, also, that each key 36 to 71 will control the operation of its own master relay, which will in turn control the operation of individual relays which operate upon the motor 10 or the servo pressure cylinder 86. In order to reduce weight, it may be possible to combine the functions of at least certain of the relays 80 and 84 on more than one key, the master key relays controlling the selection of the appropriate operating relays.

Figure 4:
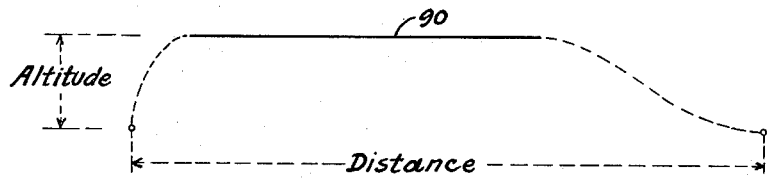
FIG. 4 is a diagrammatic illustration of one type of guided flight or movement.
Figure 5:
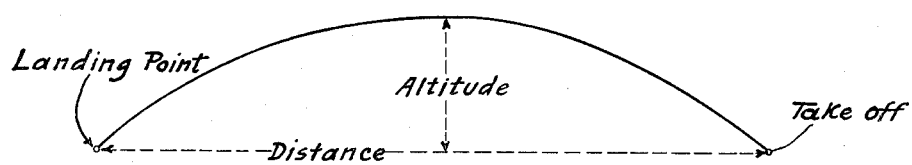
FIG. 5 is a view similar to FIG. 4 but illustrating another type of guided movement.

In FIGS. 4 and 5 have been illustrated typical flight paths for an airplane controlled by the apparatus of the present invention. In FIG. 4, the airplane will take off from the point marked, will climb over the path of the dotted line and will then follow a substantially level flight path indicated by the solid line 90, the airplane being controlled only during movement along the solid path line 90. On the other hand, it is possible to control an airplane or other body in a curved flight path or pattern, as indicated by the solid line 91 of FIG. 5 all the way from take-off to landing point.

Having reference to FIG. 7 of the drawings, a modification of the invention has been illustrated in which the numeral 92 indicates a substantially conventional oscilloscope provided with associated apparatus for reproducing upon the screen 93 thereof an instantaneous radar image. A flexible hood 94 extends from the screen 93 to a lens system 95, and a flexible hood 96 extends from the lens system into close proximity with a film strip 97 mounted in front of a bank 98 of photo-electric cells, the output of the cells being connected to an amplifier 99.

In this arrangement of parts, the oscilloscope 92 and the support for the film strip 97, can be kept stationary, and the lens 95 can be moved to effect the scanning action. To this end, the lens system 95 is resiliently mounted upon springs 100 and 101, and a rod 102 extending rigidly from the lens system is provided with a cam follower 103 which is received in a spirally cut cam groove in a circular plate 104. The circular plate 104 is mounted on the end of a shaft 105 journaled in bearings 106. The drive and general arrangement of the circular plate 104 and the shaft 105 is similar to the plate 20 and shaft 23 heretofore described in conjunction with FIG. 1, the result being that the lens system 95 is given a spiral movement so that the image from the screen 93 effectively scans the film strip 97 until a match is effected at which time the photo-electric cells 98 serve to actuate the amplifier 99 to control the operation of keys and relays of the type heretofore described in conjunction with FIG. 1.

Also, in this embodiment of the invention the film strip 97 may comprise a series of previously prepared actual or simulated pictures or frames of the terrain over which the body is moving with the strip being moved ahead in jumps, like a motion picture film, rather than moved at the same constant speed. The word "moved" as employed in the specification and claims is intended to cover either the jump type movement or the continuous movement, and the word film is intended to cover either a continuous map or a series of map frames or pictures as long as the frames or pictures are advanced in turn to matching position.

The terms "map," "picture," "image," as employed in the specification and claims are intended to cover a reasonable range of equivalents whereby information regarding the course and taken when flying over the course is compared with previously recorded or prepared information of the same course or terrain.

The invention of the present application is being referred to as "atran," which is taken from the words "automatic terrain recognition and navigation."

From the foregoing, it will be recognized that the various objects of the invention have been achieved by the provision of improved methods and apparatus for controlling movement of various bodies over a wide variety of courses and conditions.

While in accord with the patent statutes, the invention has been specifically illustrated and described with respect to particular embodiment thereof, it is to be particularly understood that the invention is not to be limited thereto or thereby, but that its scope is defined in the appended claims.

What is claimed is:

1. In combination, a film bearing a map image of a stretch of terrain over which a body is to move, motor means for moving the film, means for producing a substantially instantaneous image of the terrain over which the body is moving, said instantaneous image being of substantially the same scale and orientation as the map image and being superimposed upon the map image, means for effecting periodically repeated scanning movement between the superimposed images, means for determining the position of match between the images, and means responsive to the match determining means for controlling a direction of movement of the body in response to the position of match of the images.

2. In combination, a body, means for moving the body, means bearing a map image of a stretch of terrain over which the body is to move, motor means for advancing the map image substantially in accord with the speed of movement of the body, means for producing a substantially instantaneous image of the terrain over which the body is moving, said instantaneous image being of substantially the same scale and orientation as the map image and being superimposed upon the map image, means for effecting periodically repeated scanning movement between the superimposed images, means for determining the position of match between the images, means for varying the speed of the motor means in response to the position of match of the images, and means for controlling a direction of movement of the body in response to the position of match of the images.

3. In combination, a strip film bearing a radar map of a stretch of terrain over which a body is to move, motor means for advancing the film, means for continuously presenting an instantaneous radar image of the terrain over which the body is moving, said radar image being of substantially the same scale and orientation as the map image and being superimposed upon the map image, means for effecting periodically repeated scanning movement between the superimposed images, means for indicating a match between the images, means for controlling a direction of movement of the body in response to the position of match of the images.

4. In combination, a strip film bearing a radar map of a stretch of terrain over which a body is to move, motor means for continuously unwinding the film, means for continuously presenting an instantaneous radar image of the terrain over which the body is moving, said radar image and map being substantially to the same scale and orientation means effecting relative superimposement of the radar and map images, means for effecting periodically repeated scanning movement between the superimposed images, means for indicating a position of match between the images, means responsive to the last-named means for varying the speed of the motor means in response to the position of match of the images, and means responsive to the match indicating means for controlling a direction of movement of the body in response to the position of match of the images.

5. Apparatus for automatically guiding an airplane or the like over a stretch of terrain, the apparatus including an oscilloscope for reproducing an instantaneous radar image, a film strip bearing a radar map of the terrain over which the airplane is to pass said image and map having substantially the same scale and orientation, motor means advancing the film strip map substantially at a speed to coordinate the movement of the map with the passage of the airplane over the terrain, means mounting the film strip map for relative superimposed movement with respect to the instantaneous radar image, means for effecting a spiral scanning movement between the film strip map and the radar image, means for indicating substantially a match between the radar image and the map, push button means operated by the last-named means and coordinated with the scanning means, relay means operated by the push button means, prime mover means controlled by the relay means, and means operated by the prime mover means for changing the position for a selected time interval of a control surface on the airplane.

6. Automatic guidance mechanism for airplanes or other vehicles or bodies including a film strip bearing a map image of the course to be followed, means for moving the film strip image, means for producing a substantially instantaneous image of the terrain over which the airplane is passing, said images having substantially the same scale and orientation, a lens system for superimposing said images and for effecting a scanning action therebetween, photoelectric cell means for indicating a match between the images, means controlled by the photoelectric cell means for changing the speed of movement of the means for moving the film strip image, and means controlled by the photo-electric cell means for deflecting a control surface on the airplane for a time interval substantially sufficient to bring the airplane fully on course.

7. That method of guiding an airplane or other body over a course which includes the steps of comparing a substantially instantaneous picture of the course with a previously prepared picture of the course, effecting scanning movement of the pictures to effect substantially a match thereof, moving the prepared picture, and coordinating the speed of movement of the prepared picture to the speed of movement of the body.

8. That method of guiding an airplane or other body over a course which includes the steps of comparing a substantially instantaneous picture of the course with a previously prepared picture of the course, effecting scanning movement of the pictures to effect substantially a match thereof, and correcting the guiding controls on the body in response to the substantial matching position of the pictures to bring the body back to substantially the center of its on-course position.

9. Mechanism for guiding a body in its movement over a course including a means for providing an instantaneous radar image of the course over which the body is moving, a strip radar map image of the desired course, means unwinding the map substantially in accord with the speed of movement of the body, means for superimposing the images, means having a spiral camway and including a motor for moving the images in a spiral path relative to each other, said last-named means having a helical camway associateed therewith, a block movable from one end to the other of the helical camway, means for automatically reversing the motor as the block nears the end of its travel, a solenoid carried by the block, a series of push buttons positioned beneath the line of travel of the solenoid, means responsive to substantially a match of the images to operate the solenoid to actuate a push button beneath the solenoid, a relay system associated with each push button, means controlled by the relay system to change the speed of movement of the map unwinding means, and means controlled by the relay system to correct the movement of the body to return it to substantially on-course position.

10. Mechanism for guiding a body in its movement over a course including a means for providing an instantaneous radar image of the course over which the body is moving, a strip radar map image of the desired course, means unwinding the map substantially in accord with the speed of movement of the body, means for superimposing the images, means having a spiral camway and including a motor for moving the images in a spiral path relative to each other, said last-named means having a helical camway associated therewith, a block movable from one end to the other of the helical camway, means for automatically reversing the motor as the block nears the end of its travel, a solenoid carried by the block, a series of push buttons positioned beneath the line of travel of the solenoid, means responsive to substantially a match of the images to operate the solenoid to actuate a push button beneath the solenoid, a relay system associated with each pushbutton, and means controlled by the relay system to correct the movement of the body to return it to substantially on-course position.

11. Apparatus for automatically guiding an airplane or the like including means for producing a radar picture of a portion of the terrain over which the airplane is flying, a previously prepared radar map of the terrain to substantially the same scale and orientation as the picture, a lens system superimposing the map and picture, means for moving the lens system to effect a scanning movement between the map and picture, means responsive to substantially a match between the map and picture, and means initiated by the last-named means and controlled by the position of the lens moving means for returning the airplane to its proper course.

12. That method of guiding an airplane or other body over a course which includes the steps of superimposing an instantaneous radar picture of the course upon a strip radar picture of the course, said radar and strip pictures being substantially similarly oriented and to the same scale, effecting scanning movement of the pictures to effect substantially a match thereof, continuously moving the strip picture, coordinating the speed of movement of the strip picture to the speed of movement of the body, and correcting the guiding controls on the body in response to the matching position of the pictures to bring the body back to substantially the center of its on-course position.

References Cited in the file of this patent
UNITED STATES PATENTS

| | | |
|---|---|---|
| 1,747,664 | Droitcour | Feb. 18, 1930 |
| 2,027,527 | Hammond | Jan. 14, 1936 |
| 2,027,530 | Hammond | Jan. 14, 1936 |
| 2,307,029 | Elm | Jan. 5, 1943 |
| 2,428,427 | Loughren | Oct. 7, 1947 |